(12) United States Patent
Yu et al.

(10) Patent No.: US 9,110,321 B2
(45) Date of Patent: Aug. 18, 2015

(54) FRAMELESS LIQUID CRYSTAL DISPLAY DEVICE

(75) Inventors: Gang Yu, Shenzhen (CN); Liuyang Yang, Shenzhen (CN); Pei Jia, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 294 days.

(21) Appl. No.: 13/642,470

(22) PCT Filed: Aug. 30, 2012

(86) PCT No.: PCT/CN2012/080739
§ 371 (c)(1),
(2), (4) Date: Oct. 19, 2012

(87) PCT Pub. No.: WO2014/029122
PCT Pub. Date: Feb. 27, 2014

(65) Prior Publication Data
US 2014/0055710 A1    Feb. 27, 2014

(30) Foreign Application Priority Data
Aug. 21, 2012   (CN) .......................... 2012 1 0298975

(51) Int. Cl.
G02F 1/1333   (2006.01)
G02F 1/1335   (2006.01)

(52) U.S. Cl.
CPC .... G02F 1/133308 (2013.01); G02F 1/133608 (2013.01); *G02F 2001/133314* (2013.01); *G02F 2001/133317* (2013.01)

(58) Field of Classification Search
CPC ..................... G02F 1/133308; G02F 1/133608
USPC ........................................................... 349/58
See application file for complete search history.

(56) References Cited

FOREIGN PATENT DOCUMENTS

| | | |
|---|---|---|
| CN | 101498863 A | 8/2009 |
| CN | 102237063 A | 11/2011 |
| CN | 102393579 A | 3/2012 |
| CN | 102456292 A | 5/2012 |
| CN | 102566098 A | 7/2012 |
| JP | 2003-5158 A | 1/2003 |

*Primary Examiner* — Phu Vu
(74) *Attorney, Agent, or Firm* — Cheng-Ju Chiang

(57) ABSTRACT

The present invention provides a frameless liquid crystal display device, which includes a rear enclosure, a backlight module arranged inside the rear enclosure, a mold frame arranged on the backlight module and mounted to the rear enclosure, and a liquid crystal display panel arranged on the mold frame. The liquid crystal display panel includes a CF substrate and a TFT substrate laminated on the CF substrate with first and second steps formed between edges of the CF substrate and the TFT substrate that correspond to opposite sides of the mold frame. The mold frame forms a retention section corresponding to the second step. The second step is received in and retained by the retention section. A surface decoration is bonded to the first step and fixed to the mold frame so as to fix the liquid crystal display panel to the mold frame.

15 Claims, 3 Drawing Sheets

FRAMELESS LIQUID CRYSTAL DISPLAY DEVICE

BACKGROUND OF THE INVENTION

1. Field of the Invention

The present invention relates to a display device, and in particular to a frameless liquid crystal display device.

2. The Related Arts

A liquid crystal display (LCD) has various advantages, such as thin device body, less power consumption, and being free of radiation, and is thus widely used. Most of the liquid crystal displays available in the market are backlighting liquid crystal displays, which comprise a liquid crystal display panel and a backlight module. The principle of operation of the liquid crystal display panel is that liquid crystal molecules are arranged between two parallel glass substrates and electricity is selectively applied to cause change of the orientation of the liquid crystal molecules in order to refract the light from a backlight module for emission and formation of an image.

The liquid crystal display generally comprises a rear enclosure and a front enclosure mating the rear enclosure, a backlight module arranged in the rear enclosure, a mold frame arranged on the backlight module, and a liquid crystal display panel arranged on the mold frame. The mold frame functions to support the liquid crystal display panel, while the front enclosure retains the liquid crystal display panel in position.

The liquid crystal display panel comprises a color filter (CF) substrate, a thin-film transistor (TFT) substrate, liquid crystal (LC) interposed between the CF substrate and the TFT substrate, and a sealant. A step is formed between edges of the CF substrate and the TFT substrate for electrical connection with an external device to drive the liquid crystal display panel.

The continuous progress of the techniques for manufacturing liquid crystal displays drives the liquid crystal displays in a direction toward a slim bezel configuration and further toward a frameless configuration. However, fixing a liquid crystal display panel of a frameless liquid crystal display is still a tough problem today.

Referring to FIG. 1, a schematic view of a known structure of frameless liquid crystal display is shown, which comprises a rear enclosure 100, a backlight module 300 arranged inside the rear enclosure 100, a mold frame 500 arranged on the backlight module and fixedly coupled to the rear enclosure 100, and a liquid crystal display panel 700 arranged on the mold frame 500. The liquid crystal display panel and the mold frame 500 are bonded to each other by a piece of double-sided adhesive tape 900. A surface decoration 110 is provided in a step 724 between the TFT substrate 702 and the CF substrate 704 of the liquid crystal display panel 700 to further fix the liquid crystal display panel 700 so as to achieve fixation of the liquid crystal display panel of frameless liquid crystal display.

To securely fix the liquid crystal display panel 700 to the mold frame 500, the double-sided adhesive tape 900 must be of sufficient bonding strength. This leads to hard removal of the double-sided adhesive tape 900 in disassembling the liquid crystal display panel 700 and eventually damage of the liquid crystal display panel 700 may result, causing great loss and increasing maintenance cost.

SUMMARY OF THE INVENTION

An object of the present invention is to provide a frameless liquid crystal display device, which has a simple structure, is easy to assemble, and can effectively reduce expense of maintenance.

To achieve the object, the present invention provides a frameless liquid crystal display device, which comprises a rear enclosure, a backlight module arranged inside the rear enclosure, a mold frame arranged on the backlight module and mounted to the rear enclosure, and a liquid crystal display panel arranged on the mold frame. The liquid crystal display panel comprises a CF substrate and a TFT substrate laminated on the CF substrate with first and second steps formed between edges of the CF substrate and the TFT substrate that correspond to opposite sides of the mold frame. The mold frame forms a retention section corresponding to the second step. The second step is received in and retained by the retention section. A surface decoration is bonded to the first step and fixed to the mold frame so as to fix the liquid crystal display panel to the mold frame.

The mold frame is fixed to the rear enclosure by screws.

The surface decoration is fixed to the mold frame by screws.

A cushioning pad is arranged between the liquid crystal display panel and the mold frame.

A top face of the surface decoration, a top face of the CF substrate, and a top face of the retention section of the mold frame all located on a same plane.

A cushioning structure is arranged between the surface decoration and the liquid crystal display panel.

The liquid crystal display panel comprises liquid crystal interposed between the CF substrate and the TFT substrate and a top polarization plate and a bottom polarization plate respectively laminated to the CF substrate and the TFT substrate.

The backlight module comprises a backplane, a backlight source arranged inside the backplane, a reflector plate arranged inside the backplane, a light guide plate positioned on the reflector plate, and an optic film assembly positioned on the light guide plate.

The backplane comprises a bottom board and a side board connected to the bottom board. The backlight source is mounted to the side board. The reflector plate is arranged on the bottom board.

A heat dissipation board is arranged between the backlight source and the backplane the side board. The backlight source is bonded by thermal paste to the heat dissipation board. The heat dissipation board is bonded by thermal paste or fixed by screws to the side board of the backplane so as to fix the backlight source to the side board of the backplane.

The present invention also provides a frameless liquid crystal display device, which comprises a rear enclosure, a backlight module arranged inside the rear enclosure, a mold frame arranged on the backlight module and mounted to the rear enclosure, and a liquid crystal display panel arranged on the mold frame, the liquid crystal display panel comprising a CF substrate and a TFT substrate laminated on the CF substrate with first and second steps formed between edges of the CF substrate and the TFT substrate that correspond to opposite sides of the mold frame, the mold frame forming a retention section corresponding to the second step, the second step being received in and retained by the retention section, a surface decoration being bonded to the first step and fixed to the mold frame so as to fix the liquid crystal display panel to the mold frame;

wherein the mold frame is fixed to the rear enclosure by screws;

wherein the surface decoration is fixed to the mold frame by screws;

wherein a cushioning pad is arranged between the liquid crystal display panel and the mold frame;

wherein a top face of the surface decoration, a top face of the CF substrate, and a top face of the retention section of the mold frame all located on a same plane;

wherein a cushioning structure is arranged between the surface decoration and the liquid crystal display panel;

wherein the liquid crystal display panel comprises liquid crystal interposed between the CF substrate and the TFT substrate and a top polarization plate and a bottom polarization plate respectively laminated to the CF substrate and the TFT substrate;

wherein the backlight module comprises a backplane, a backlight source arranged inside the backplane, a reflector plate arranged inside the backplane, a light guide plate positioned on the reflector plate, and an optic film assembly positioned on the light guide plate;

wherein the backplane comprises a bottom board and a side board connected to the bottom board, the backlight source being mounted to the side board, the reflector plate being arranged on the bottom board; and wherein a heat dissipation board is arranged between the backlight source and the backplane the side board, the backlight source being bonded by thermal paste to the heat dissipation board, the heat dissipation board being bonded by thermal paste or fixed by screws to the side board of the backplane so as to fix the backlight source to the side board of the backplane.

The efficacy of the present invention is that the present invention provides a frameless liquid crystal display device, which comprises a mold frame forming a retention section and a liquid crystal display panel forming a step mating the retention section so as to mount the liquid crystal display panel to the mold frame in a removable manner thereby realizing fixation of the liquid crystal display panel of the frameless liquid crystal display device, which has a simple structure and is easy to install so as to allow easy removal of the liquid crystal display panel for maintenance or replacement and effective reduction of maintenance expense.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
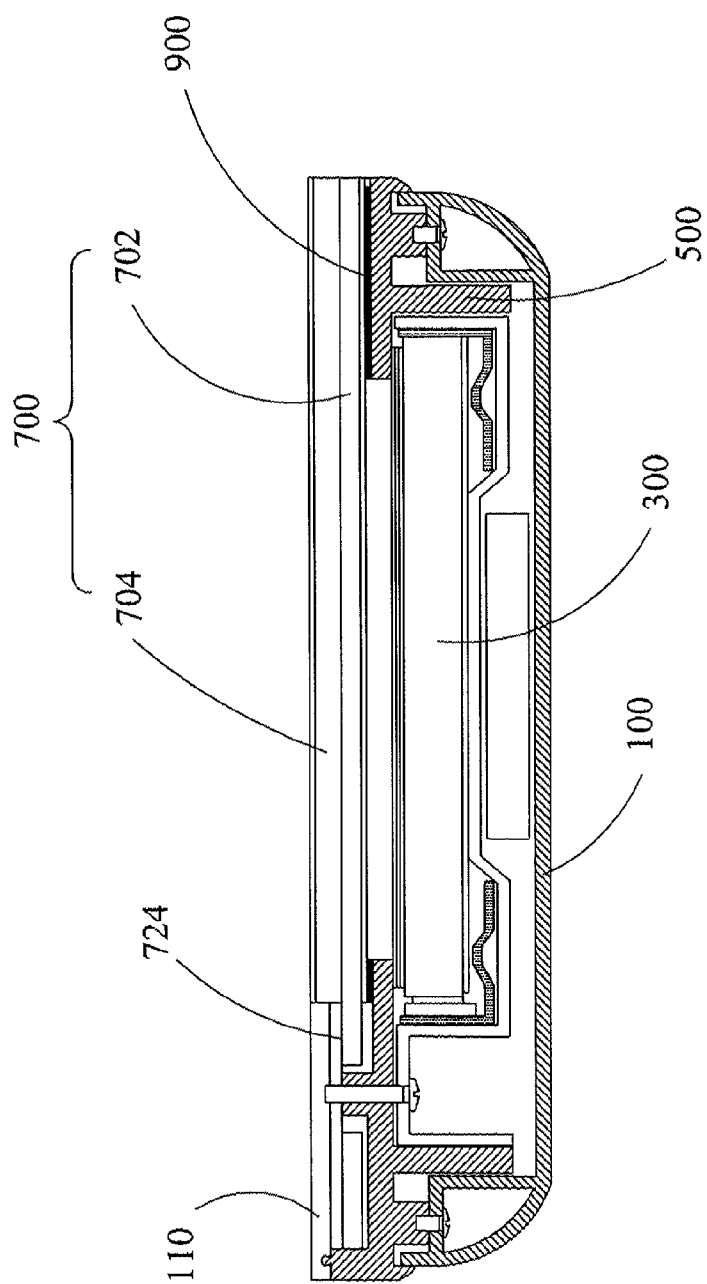
FIG. 1 is a schematic view showing the structure of a conventional frameless liquid crystal display device.
Figure 2:
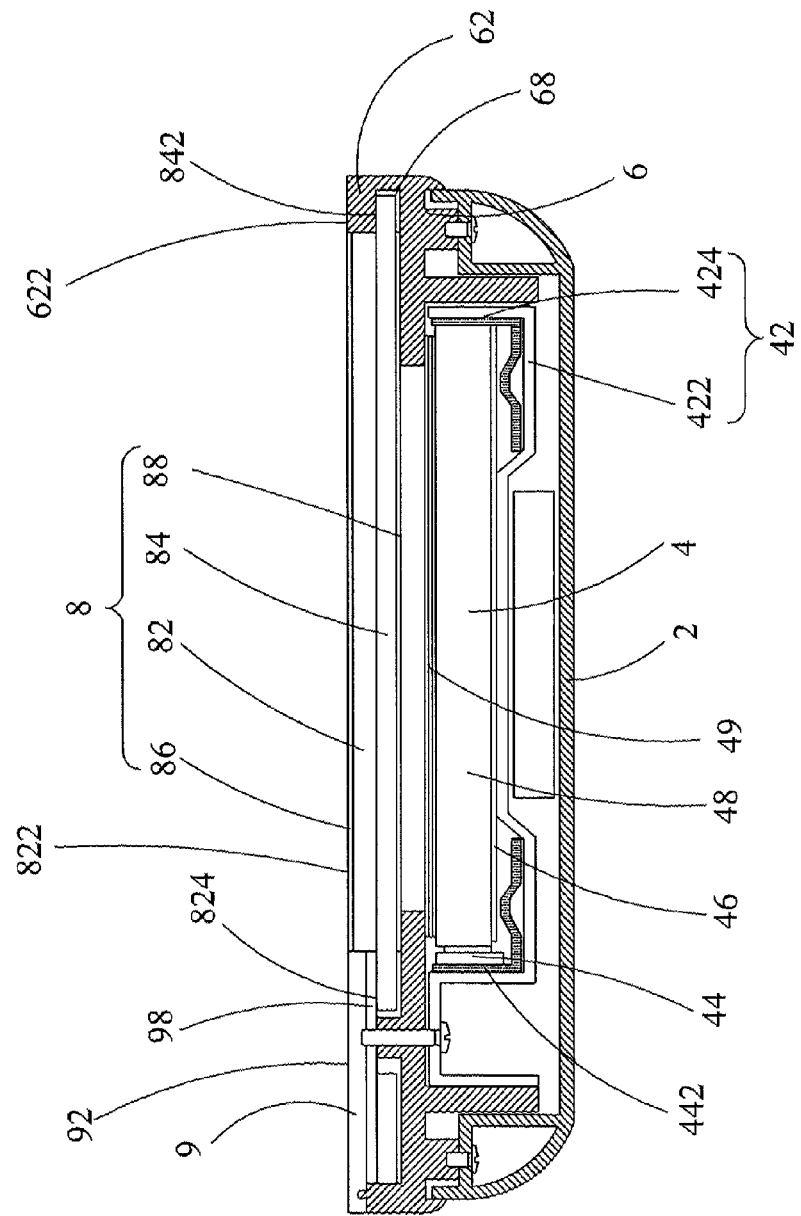
FIG. 2 is a schematic view showing the structure of a frameless liquid crystal display device according to the present invention.
Figure 3:
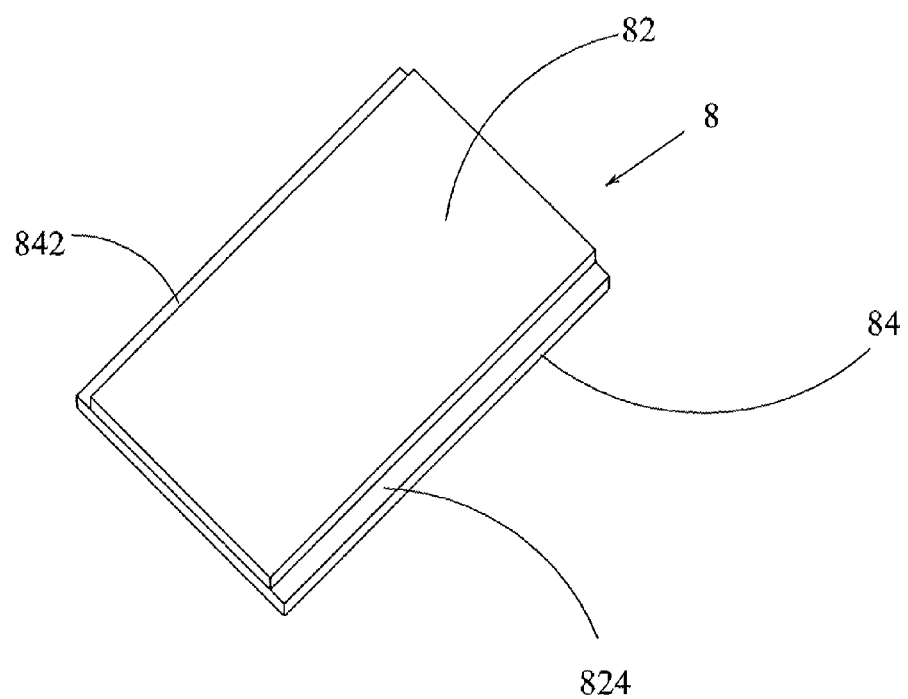
FIG. 3 is a perspective view showing a liquid crystal display panel of FIG. 2.

Referring to FIGS. 2 and 3, the present invention provides a frameless liquid crystal display device, which comprises: a rear enclosure 2, a backlight module 4 arranged inside the rear enclosure 2, a mold frame 6 arranged on the backlight module 4 and mounted to the rear enclosure 2, and a liquid crystal display panel 8 arranged on the mold frame 6. In the instant embodiment, the mold frame 6 is fixed to the rear enclosure 2 by screws.

The liquid crystal display panel 8 comprises a color filter (CF) substrate 82 and a TFT substrate 84 laminated on the CF substrate 82. First and second steps 824, 842 are formed between edges of the CF substrate 82 and the TFT substrate 84 that correspond to opposite sides of the mold frame.

The mold frame 6 forms a retention section 62 corresponding to the second step 842 and the second step 842 is received in and retained by the retention section 62 so as to fix an end of the liquid crystal display panel 8 that is adjacent to the second step 842 to the mold frame 6.

A surface decoration 9 is pressed and bonded to the first step 824 and is fixed to the mold frame 6 by screws so as to fix an end of the liquid crystal display panel 8 that is adjacent to the first step 824 to the mold frame. Thus, the liquid crystal display panel 8 is completely fixed to the mold frame 6 and the mold frame 6 is fixed to the rear enclosure 2 by screws so as to form a complete set of frameless liquid crystal display device.

Preferably, a top face 92 of the surface decoration 9, a top face 822 of the CF substrate 82, and a top face 622 of the retention section 62 of the mold frame 6 are all located on the same plane to provide the liquid crystal display device with a good appearance.

To protect the liquid crystal display panel 8, a cushioning pad 68 may be added between the liquid crystal display panel 8 and the mold frame 6 and a cushioning structure 98 provided between the surface decoration 9 and the liquid crystal display panel 8.

The cushioning pad 68 can be integrally formed with the cushioning structure 98 and is preferably a cushioning pad having a T-shaped cross-section, whereby protection can be effected for both upper and lower surface and lateral edges of the liquid crystal display panel 8.

The cushioning pad 68 can alternatively be separate from the cushioning structure 98 and the specific shape can be selected according different applications. All these variations can achieve the same technical effect of the present invention.

To assemble, the second step 842 of the liquid crystal display panel 8 is first positioned in the retention section 62 of the mold frame 6 and then the surface decoration 9 is positioned on the first step 824 of the liquid crystal display panel 8. Afterwards, the mold frame 6 is positioned on the backlight module 4 and screws are applied to secure the backplane 42 of the backlight module 4, the mold frame 6, and the surface decoration 9 together thereby fixing the liquid crystal display panel 8 to the mold frame 6. Finally, the rear enclosure 2 is assembled to the mold frame 6 and is fixed by screws to the mold frame 6 to complete the assembling operation of the frameless liquid crystal display device.

The backlight module 4 comprises a backplane 42, a backlight source 44 arranged inside the backplane 42, a reflector plate 46 arranged inside the backplane 42, a light guide plate 48 positioned on the reflector plate 46, and an optic film assembly 49 positioned on the light guide plate 48.

The backplane 42 comprises a bottom board 422 and a side board 424 connected to the bottom board 422. The backlight source 44 is mounted to the side board 424. The reflector plate 46 is arranged on the bottom board 422. Preferably, a heat dissipation board 442 is additionally arranged between the backlight source 44 and the side board 424 of the backplane 42. The backlight source 44 is bonded by thermal paste (not shown) to the heat dissipation board 442 and the heat dissipation board 442 is bonded by thermal paste or is fixed by screws to the side board 424 of the backplane 42 so as to fix the backlight source 44 to the side board 424 of the backplane 42.

The backlight source 44 comprises a linear light source, preferably a light-emitting diode (LED) light bar that emits light a portion of which directly enters the light guide plate 48 by traveling through a light incidence face of the light guide plate 48 and a remaining portion is guided into the light guide plate 48 by being reflected by the reflector plate 49. The light propagates in the light guide plate 48, while being subjected to total reflection and refraction so as to provide a homogenous planar light source to the liquid crystal display panel 8.

The liquid crystal display panel 8 further comprises liquid crystal (not shown) interposed between the CF substrate 82 and the TFT substrate 84 and a top polarization plate 86 and a bottom polarization plate 88 respectively laminated to the CF substrate 82 and the TFT substrate 84.

The planar light source provided by the backlight module 4 is first polarized by the bottom polarization plate 88, then transmits through the liquid crystal molecules, and is finally polarized by the top polarization plate 86 to emerge from the liquid crystal display panel 8 for realization of image displaying.

In summary, the present invention provides a frameless liquid crystal display device, which comprises a mold frame forming a retention section and a liquid crystal display panel forming a step mating the retention section so as to mount the liquid crystal display panel to the mold frame in a removable manner thereby realizing fixation of the liquid crystal display panel of the frameless liquid crystal display device, which has a simple structure and is easy to install so as to allow easy removal of the liquid crystal display panel for maintenance or replacement and effective reduction of maintenance expense.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A frameless liquid crystal display device, comprising a rear enclosure, a backlight module arranged inside the rear enclosure, a mold frame arranged on the backlight module and mounted to the rear enclosure, and a liquid crystal display panel arranged on the mold frame, the liquid crystal display panel comprising a color filter (CF) substrate and a thin film transistor (TFT) substrate laminated on the CF substrate with first and second steps formed between edges of the CF substrate and the TFT substrate that correspond to opposite sides of the mold frame, the mold frame forming a retention section corresponding to the second step, the second step being received in and retained by the retention section, a surface decoration being bonded to the first step and fixed to the mold frame so as to fix the liquid crystal display panel to the mold frame;
wherein a top face of the surface decoration, a top face of the CF substrate, and a top face of the retention section of the mold frame all located on a same plane.

2. The frameless liquid crystal display device as claimed in claim 1, wherein the mold frame is fixed to the rear enclosure by screws.

3. The frameless liquid crystal display device as claimed in claim 1, wherein the surface decoration is fixed to the mold frame by screws.

4. The frameless liquid crystal display device as claimed in claim 1, wherein a cushioning pad is arranged between the liquid crystal display panel and the mold frame.

5. The frameless liquid crystal display device as claimed in claim 1, wherein a cushioning structure is arranged between the surface decoration and the liquid crystal display panel.

6. The frameless liquid crystal display device as claimed in claim 1, wherein the liquid crystal display panel comprises liquid crystal interposed between the CF substrate and the TFT substrate and a top polarization plate and a bottom polarization plate respectively laminated to the CF substrate and the TFT substrate.

7. The frameless liquid crystal display device as claimed in claim 1, wherein the backlight module comprises a backplane, a backlight source arranged inside the backplane, a reflector plate arranged inside the backplane, a light guide plate positioned on the reflector plate, and an optic film assembly positioned on the light guide plate.

8. The frameless liquid crystal display device as claimed in claim 7, wherein the backplane comprises a bottom board and a side board connected to the bottom board, the backlight source being mounted to the side board, the reflector plate being arranged on the bottom board.

9. The frameless liquid crystal display device as claimed in claim 8, wherein a heat dissipation board is arranged between the backlight source and the side board of the backplane, the backlight source being bonded by thermal paste to the heat dissipation board, the heat dissipation board being bonded by thermal paste or fixed by screws to the side board of the backplane so as to fix the backlight source to the side board of the backplane.

10. A frameless liquid crystal display device, comprising a rear enclosure, a backlight module arranged inside the rear enclosure, a mold frame arranged on the backlight module and mounted to the rear enclosure, and a liquid crystal display panel arranged on the mold frame, the liquid crystal display panel comprising a color filter (CF) substrate and a thin film transistor (TFT) substrate laminated on the CF substrate with first and second steps formed between edges of the CF substrate and the TFT substrate that correspond to opposite sides of the mold frame, the mold frame forming a retention section corresponding to the second step, the second step being received in and retained by the retention section, a surface decoration being bonded to the first step and fixed to the mold frame so as to fix the liquid crystal display panel to the mold frame;
wherein the mold frame is fixed to the rear enclosure by screws;
wherein the surface decoration is fixed to the mold frame by screws;
wherein a cushioning pad is arranged between the liquid crystal display panel and the mold frame;
wherein a top face of the surface decoration, a top face of the CF substrate, and a top face of the retention section of the mold frame all located on a same plane;
wherein a cushioning structure is arranged between the surface decoration and the liquid crystal display panel;
wherein the liquid crystal display panel comprises liquid crystal interposed between the CF substrate and the TFT substrate and a top polarization plate and a bottom polarization plate respectively laminated to the CF substrate and the TFT substrate;
wherein the backlight module comprises a backplane, a backlight source arranged inside the backplane, a reflector plate arranged inside the backplane, a light guide plate positioned on the reflector plate, and an optic film assembly positioned on the light guide plate;

wherein the backplane comprises a bottom board and a side board connected to the bottom board, the backlight source being mounted to the side board, the reflector plate being arranged on the bottom board; and wherein a heat dissipation board is arranged between the backlight source and the side board of the backplane, the backlight source being bonded by thermal paste to the heat dissipation board, the heat dissipation board being bonded by thermal paste or fixed by screws to the side board of the backplane so as to fix the backlight source to the side board of the backplane.

11. A frameless liquid crystal display device, comprising a rear enclosure, a backlight module arranged inside the rear enclosure, a mold frame arranged on the backlight module and mounted to the rear enclosure, and a liquid crystal display panel arranged on the mold frame, the liquid crystal display panel comprising a color filter (CF) substrate and a thin film transistor (TFT) substrate laminated on the CF substrate with first and second steps formed between edges of the CF substrate and the TFT substrate that correspond to opposite sides of the mold frame, the mold frame forming a retention section corresponding to the second step, the second step being received in and retained by the retention section, a surface decoration being bonded to the first step and fixed to the mold frame so as to fix the liquid crystal display panel to the mold frame;

wherein a cushioning structure is arranged between the surface decoration and the liquid crystal display panel.

12. The frameless liquid crystal display device as claimed in claim 11, wherein the liquid crystal display panel comprises liquid crystal interposed between the CF substrate and the TFT substrate and a top polarization plate and a bottom polarization plate respectively laminated to the CF substrate and the TFT substrate.

13. The frameless liquid crystal display device as claimed in claim 11, wherein the backlight module comprises a backplane, a backlight source arranged inside the backplane, a reflector plate arranged inside the backplane, a light guide plate positioned on the reflector plate, and an optic film assembly positioned on the light guide plate.

14. The frameless liquid crystal display device as claimed in claim 13, wherein the backplane comprises a bottom board and a side board connected to the bottom board, the backlight source being mounted to the side board, the reflector plate being arranged on the bottom board.

15. The frameless liquid crystal display device as claimed in claim 14, wherein a heat dissipation board is arranged between the backlight source and the side board of the backplane, the backlight source being bonded by thermal paste to the heat dissipation board, the heat dissipation board being bonded by thermal paste or fixed by screws to the side board of the backplane so as to fix the backlight source to the side board of the backplane.

* * * * *